United States Patent
Hendriks et al.

(10) Patent No.: US 7,613,388 B2
(45) Date of Patent: Nov. 3, 2009

(54) FOCUSING LENS WITH ELECTROWETTING BASED MACRO SWITCH

(75) Inventors: Bernardus Hendrikus Wilhelmus Hendriks, Eindhoven (NL); Stein Kuiper, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 401 days.

(21) Appl. No.: 10/599,371

(22) PCT Filed: Mar. 23, 2005

(86) PCT No.: PCT/IB2005/050991
§ 371 (c)(1),
(2), (4) Date: Sep. 27, 2006

(87) PCT Pub. No.: WO2005/096030
PCT Pub. Date: Oct. 13, 2005

(65) Prior Publication Data
US 2007/0201850 A1 Aug. 30, 2007

(30) Foreign Application Priority Data
Mar. 31, 2004 (EP) .................................. 04101332

(51) Int. Cl.
*G03B 17/00* (2006.01)
*G02B 1/06* (2006.01)

(52) U.S. Cl. ............................ 396/72; 359/665; 359/666
(58) Field of Classification Search .................. 396/89, 396/72; 359/665, 228, 666
See application file for complete search history.

(56) References Cited

U.S. PATENT DOCUMENTS

| 6,288,846 B1* | 9/2001 | Stoner, Jr. ..................... 359/666 |
| 2001/0017985 A1* | 8/2001 | Tsuboi et al. ................ 396/506 |
| 2002/0090168 A1* | 7/2002 | Bartels ......................... 385/16 |
| 2003/0012483 A1 | 1/2003 | Ticknor et al. |
| 2004/0170422 A1* | 9/2004 | Chauhan ...................... 396/376 |

FOREIGN PATENT DOCUMENTS

| JP | 2000356751 A1 | 12/2000 |
| WO | WO 2003069380 A1 | 8/2003 |
| WO | WO 2004027490 A1 | 4/2004 |
| WO | WO 2004102251 A1 | 11/2004 |

* cited by examiner

*Primary Examiner*—W B Perkey
*Assistant Examiner*—Leon W Rhodes

(57) ABSTRACT

The present invention provides a discretely adjustable lens (300) that is controllable by means of electrostatic or electrowetting forces. The lens provides two accurately reproducible and freely designable lens states that are defined by interfaces between one out of two fluids (120,121) and at least one lens face (155). Changing place of the fluids by means of electrostatic or electrowetting forces provides for switching between the lens states. The lens may, for example, provide a macro lens option in a camera lens arrangement.

10 Claims, 3 Drawing Sheets

FOCUSING LENS WITH ELECTROWETTING BASED MACRO SWITCH

The present invention relates to discretely adjustable lenses, and in particular to such lenses that are suitable for use as macro lens in a camera lens arrangements. The invention furthermore relates to camera lens arrangements that carries such a discretely adjustable lens.

In principle, every camera has a lens arrangement of some sort. Focusing lenses are characterized by their ability to focus objects at various distances from the camera. In traditional lens systems, focusing is provided by changes in the spacing between individual lenses or lens groups. The focus range is thus limited by the maximum possible displacement. In general, this means that such a lens system can focus objects at distances ranging from infinity to a limited finite distance. Hence, objects very close by (for instance scanning a business card) cannot sharply be imaged.

Alternatively the camera may carry a lens having a fixed focus. Such a lens typically has optimal focus at 70 cm distance while at other distance the image sharpness decreases. For objects at infinity this is still good enough but for images very close by this is not the case and scanning of images close by is thus not possible. Such lenses are commonly used in combination with VGA (Video Graphics Array) sensors.

In order to facilitate focusing on object that are close by, the lens system can be fitted with a macro lens. The macro lens may be a separate accessory that is added when needed, or it may be a permanent lens that is switchable between a micro state (i.e. normal operation) and a macro state (i.e. close-up operation). Such a switchable macro lens can be provided using a lens that is movable between two positions: a micro lens position and a macro lens position. However, switching between the micro state and the macro state typically introduces image aberrations. In case the lens system is tuned for accurate operation in the micro state, the macro state will thus render more or less severe aberrations. The aberrations can be compensated for using a more complex lens system, but this of course results in a higher overall complexity and thus increased cost and sized of the lens system.

Recent progress by the applicant has shown that traditional lenses may be exchanged for so-called electrowetting lenses, see e.g. WO2003/069380. The optical power of such a lens is continuously adjustable by controlling the spatial interrelationship of two immiscible fluids having different indices of refraction and being contained in a chamber. Basically, the position of each fluid is determined by the combined interaction of hydrophobic/hydrophilic contact surfaces in the chamber and electrostatic forces applied across electrodes. The respective fluid is affected differently and predictably by the hydrophobic/hydrophilic and electrostatic forces, and the fluids spatial interrelationship is thereby controllable.

A typical electrowetting lens comprises a closed chamber containing the two fluids and having hydrophobic and hydrophilic inner surfaces, such that the fluids reside in a well defined spatial interrelationship and define a lens shaped meniscus. Due to the different indices of refraction, the meniscus has an optical power on light traveling across the meniscus. Such lenses are very versatile and currently attract much focus for various applications. The advantages include low cost fabrication, no movable parts, and compact design.

Such lenses may, for example, replace movable lenses in a focusing lens system as described above. This has obvious advantages in reduced costs, elimination of movable parts, and compact design. The continuously adjustable electrowetting lens may even be fitted in front of an ordinary lens stack in order to achieve a macro lens option. However, the design is associated with some problems. In particular, it is difficult to accurately control and maintain the shape of the meniscus over an extended period of time, especially in case the lens is repeatedly switched between different states. Furthermore, as discussed above, the use of a macro lens typically results in increased image aberration, which can only be compensated for by complex, costly and bulky lens system using available techniques.

Hence, there is a need for an improved lens that is suitable for use in a macro lens application, and that is compact, low cost, and accurately controllable without the occurrence of excess image aberration.

To this end the present invention provides a lens as defined in the appended set of claims. The present invention furthermore provides an optical lens stack and a camera arrangement that comprise such a lens.

Thus, the present invention provides a lens that is discretely switchable between two different sates. Each state readily provides for different optical power (e.g. a first state corresponding to a micro state and a second state corresponding to a macro state). The lens further provides for built-in aberration compensation that may be separately tuned for each of the two states, thus reducing or even eliminating the occurrence of image aberration when switching between the two states. Such a lens finds obvious application as switchable macro lens. However, there may be other areas of application as well that requires similar functionality and where the lens according to the present invention may be applicable.

Thus, according to one aspect of the present invention, a lens is provided that comprises:
  a lens chamber defining a light path and having at least one lens face arranged along that light path;
  a storage chamber that is fluidly connected with the lens chamber, such that the lens chamber and the storage chamber together form a closed system;
  a fluid system residing in said chambers and including a first fluid, having a first index of refraction, and a second fluid, having a second index of refraction that is different from the first index of refraction, said fluids furthermore being immiscible and exhibiting different forces of attraction to electric fields; and
  a fluid system switch comprising electrodes, operative to rearrange the fluid system between a first discrete state and second discrete state by means of electrostatic forces, wherein, in the first discrete state, the at least one lens face is substantially covered by the first fluid, and, in the second discrete state, the at least one lens face is substantially covered by the second fluid.

According to this aspect of the invention, a lens that is switchable between two distinct states by means of electrostatic forces is provided. The fluids are controlled by exposing them to electric fields, similar to the electrowetting effect described above. However, the lens functionality is provided at the interface between a solid lens face and either of the two fluids. This is advantageous in that the interface has an absolutely reproducible shape. Consequently, the lens power is not controllable by changes in the interface shape as is the case for the electrowetting lens that is described above and that has a controllable meniscus. Instead, the lens power is controllable by switching between different interface media (the fluids), having different indices of refraction. Using two immiscible fluids, each having an individual index of refraction, thus provides for two distinct states.

The lens chamber and the storage chamber are fluidly connected with each other. Typically, the fluid that substantially covers the lens face (or faces) occupies a substantial volume of the lens chamber, and the other fluid is mainly contained in the storage chamber. Switching between the discrete states thus involves moving the fluids from one chamber to the other chamber. This is achieved by means of electrostatic forces, and the fluids are constantly separated from each thanks to their immiscibility.

The chambers and their fluid connection may have many different designs. In order to simplify the movement of fluids between the two chambers, the chambers are typically interconnected by two conduits. Thereby one of the conduits can be exploited for moving a fluid out of the lens chamber while the other conduit can be exploited for moving the other fluid into the lens chamber. However, the chambers may also be interconnected by only one conduit or by a larger number of conduits. Alternatively, the lens chamber and the storage chamber may form part of a single chamber. In such case, the lens chamber resides where the lens face (or faces) are located.

The controllability of the fluids may be further enhanced by the incorporation of surfaces having different wetting properties in regard of the two fluids in the fluid system. For example, in case water and oil is used, interior surface of the chambers may be coated with a hydrophobic agent such as Teflon™. In combination with electrostatic forces, movement of the fluids between the chambers is then further enhanced. The combined force, commonly known as an electrowetting force, is thus the same as the force that is utilized in the continuously adjustable electrowetting lens described above. Thus, according to one embodiment, the closed system of chambers comprises interior surfaces that have different wettability in respect of the first and the second fluids.

An advantage using a lens in accordance with the present invention is that the lens face can be given a very well defined shape. In particular, non-spherical surfaces having a virtually arbitrary shape may be provided, using for example in situ polymerization of the lens face in a removable mould. This enables a large freedom when designing the lens shape. Thereby complex lens faces that simultaneously provide a focusing and an aberration compensating effect can be designed. Hence, according to one embodiment of the present invention, at least one lens face in the lens chamber has an aspherical shape that provides for a combination of focusing power and aberration compensation.

In order to reduce the size of the lens, and, in particular, the total height of a lens stack comprising a lens in accordance with the present invention, the lens chamber may be disk shaped. In such case the lens chamber defines two opposing faces that both intersect with the optical path. This provides further increased design freedom in that both of the face may be given a lens shape. In effect, the optical power of the lens may be increased. Thus, according to one embodiment of the invention, the lens chamber has two lens faces arranged along the light path.

The optical power of the lens is thus determined by the shape/shapes of the lens face/-s and by the difference in indices of refraction in the material forming the respective lens face and the fluid that is in contact with the face/-s. Consequently, the difference in optical power between the two discrete states is determined by the difference in indices of refraction in the two fluids. In particular, a lens that is switchable between an optically passive state, having no impact on light traveling along the optical path, and an optically active state, having a desired impact on light traveling along the optical path, can be provided by selecting the index of refraction of one of the fluids equal to the index of refraction of the material forming the lens face/-s. Hence, according to one embodiment, at least one lens face is formed of a material that has the same index of refraction as one of the fluids.

There are many different options available for the two fluids. Liquids, gases, and vapors may be combined in many different ways. The important characteristics are that they have different indices of refraction, are immiscible, and have different attraction to electric fields. Furthermore, there is an obvious need for the fluids to be essentially transparent.

In practice, liquids are preferred for many applications. One convenient combination of liquids is an oil and saline water. These liquids are clearly immiscible, and oil is virtually unaffected by the application of an electric field whereas saline water, due to its electrical conductivity, is attracted by electrostatic forces. Furthermore, the refractive index (as well as the conductivity) of saline water is a function of the salinity and is thus readily adjusted.

The discretely adjustable focusing lens described above is applicable for many applications. However, macro lens applications in camera lens arrangements are a particularly advantageous application. Thus, one aspect of the present invention provides a camera lens arrangement that comprises a discretely adjustable focusing lens as defined above. When used as a macro lens, the discrete states of the discretely adjustable focusing lens correspond to a macro lens state and a micro lens state, respectively.

As described above, electrowetting lenses in general are advantageous for use in camera lens stacks. Manufacturing of electrowetting lenses typically requires dedicated manufacturing equipment. In particular, filling of the fluids into the chambers requires equipment that is not normally used when manufacturing lenses. Therefore, discretely adjustable focusing lenses in accordance with the present inventions are even more advantageous for use in combination with additional electrowetting lenses in a camera lens stack. A major advantage is that the dedicated manufacturing equipment may be utilized for manufacturing all of the electrowetting lenses. Thus, according to one embodiment, the camera lens arrangement further comprises at least one additional lens that is controllable by means of electrowetting forces.

In case the discretely adjustable focusing lens is arranged in a lens stack comprising additional lenses, it may even be formed inside one of additional lenses. Or, in other words, the outer surfaces of the discretely adjustable focusing lens may have lens shapes. This is advantageous in that the total number of components in the lens stack can be reduced, resulting in a reduced overall size and manufacturing costs. Thus, according to one embodiment, the discretely adjustable focusing lens forms an integral part of at least one additional lens in the camera lens arrangement.

The camera lens arrangement described above is applicable for many camera applications. The present invention thus provides for compact and low cost lens arrangements featuring a macro lens functionality.

The present inventions furthermore provides a camera module comprising a camera lens arrangement as described above, and a digital image sensor. Such a compact and low-cost camera module may be employed in a number of different applications including webcams, security cameras, digital video cameras, and digital still cameras.

One field of application that is currently receiving much attention is mobile phones carrying a camera. In mobile phone camera applications the compactness and cost are critical. Therefore, one aspect of the present invention provides a mobile phone having camera functionality and comprising a camera lens system as described above.

In essence, adding a discretely adjustable lens in accordance with the present invention to a camera lens arrangement facilitates switching between an ordinary camera lens state (i.e. a micro state) and an macro camera lens state, depending on which fluid that is currently in contact with the lens face/-s. The option of switching between two different aspherical lenses provides not only for simple macro lens functionality, but also for built-in aberration compensation in the lens. In this way a simple robust and cost effective solution, containing no mechanically movable part, is obtained for switching an ordinary camera lens to a macro lens and vice versa.

Detailed description of embodiments of the invention will now be described with reference to the accompanying, exemplifying drawings, on which:

Figure 1:
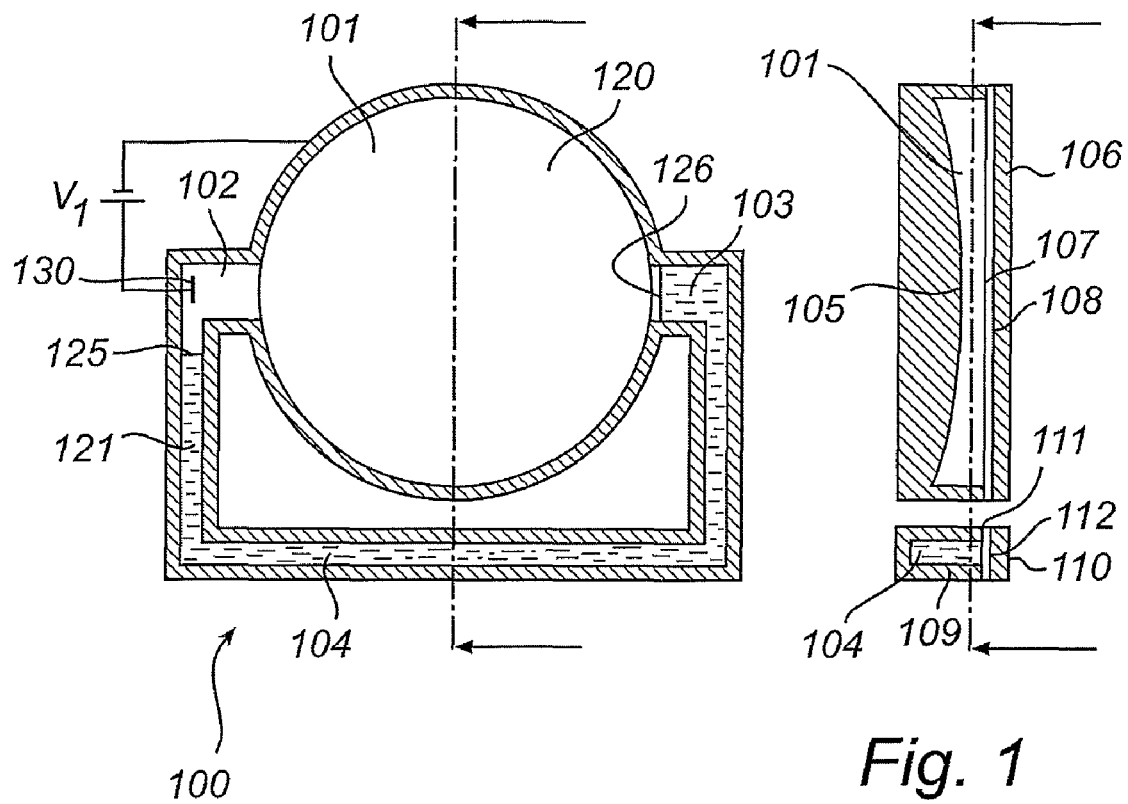
FIGS. 1 and 2 illustrate top views and cross-sections of a discretely adjustable lens having a spherical lens face and being in a first and a second discrete state, respectively.
Figure 2:
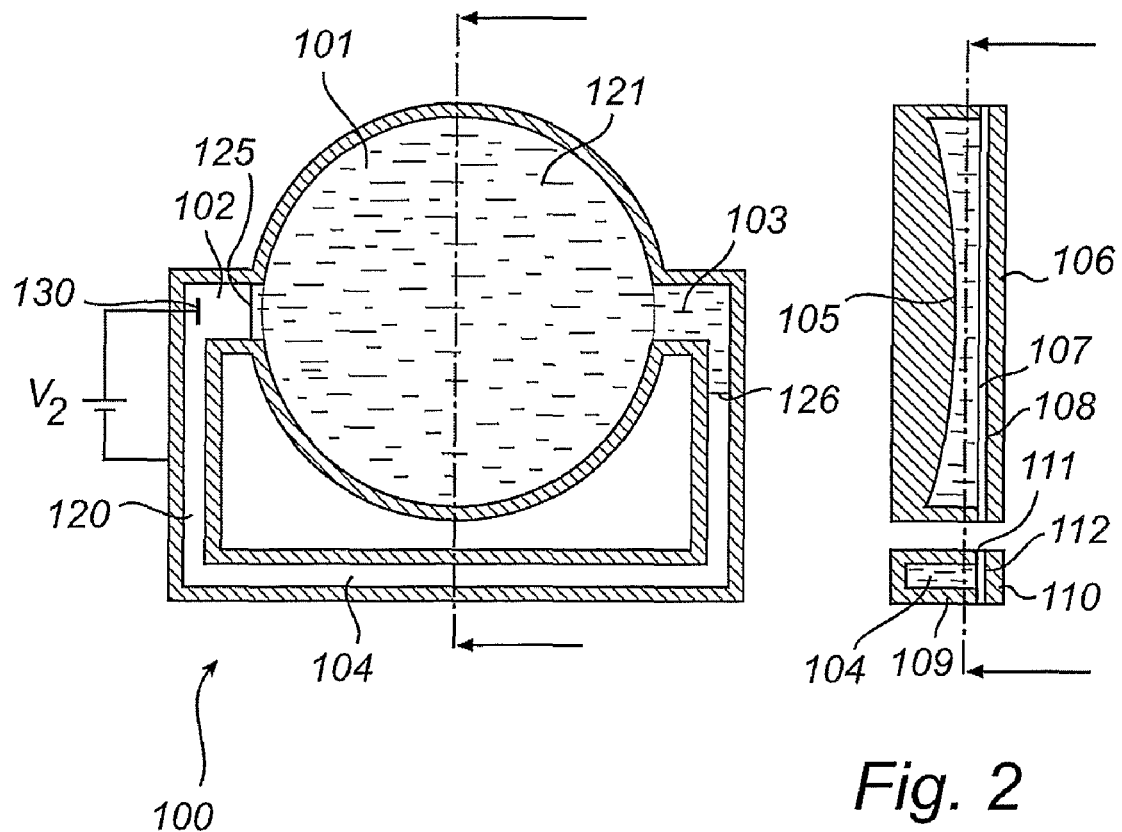

Referring to FIGS. 1 and 2 one embodiment of a lens 100 in accordance with the present invention includes a lens chamber 101, fluidly connected via two openings 102, 103 of the chamber 101 to a storage chamber 104 in the form of a conduit having two opposite ends. The first opening 102 of the lens chamber 101 is fluidly connected to the first end of the storage chamber 104 and the second opening 103 of the lens chamber 101 is fluidly connected to the second end of the storage chamber 104 so as to form a fluid tight enclosure for a fluid system. One side of the lens chamber 101 is enclosed by a lens face 105 exposed to the interior of the lens chamber 101. The lens face 105 is formed from a transparent material, for example polycarbonate.

The lens chamber 101 is further enclosed by a cover plate 106, which is a planar element formed from a transparent material, for example polycarbonate. The cover plate 106 is covered in a hydrophobic fluid contact layer 107, which is transparent and formed for example of Teflon™ AF1600™ produced by DuPont™. For some applications, the hydrophobic fluid contact layer may be omitted, whereby the manufacturing is simplified. However, in a preferred embodiment the hydrophobic contact layer is complemented by an additional hydrophobic layer arranged on the lens face 105 and further enhancing wetting and dewetting of the chamber. One surface of this hydrophobic fluid contact layer 107 is exposed to the interior of the lens chamber 101. A first electrowetting electrode 108 lays between the cover plate 106 and the hydrophilic fluid contact layer 107. This first electrowetting electrode 108 is formed as a sheet of transparent electrically conducting material, for example indium tin oxide (ITO). An insulating layer (not shown), formed for example of parylene, may be formed between the fluid contact layer 107 and the first electrowetting electrode 108. It is to be noted that the first electrowetting electrode 108 as well as the hydrophobic fluid contact layer 107 have operative areas which completely overlap with the area occupied by the lens face 105.

The storage chamber 104 is formed between storage chamber walls 109 and a cover plate 110. The cover plate 110 is covered by a hydrophobic contact layer 111 exposed on one surface to the interior of the storage chamber 104, the hydrophobic fluid contact layer 111 being formed for example of AF1600™. A second electrowetting electrode 112 lays between the cover plate 110 and the hydrophobic fluid contact layer 111. As in the lens chamber, this hydrophobic contact layer 111 may be omitted or it may be complemented by additional hydrophobic layers in the storage chamber. This electrode 112 is formed from an electrically conductive material, for example indium tin oxide (ITO). It is to be noted that the second electrowetting electrode 112 has a surface area which overlaps with most of the interior of the storage chamber 104 as seen from the top view.

The enclosed fluid system comprises a first fluid 120 (white) and a second fluid 121 (dashed). The first fluid 120 comprises an aqueous electrically conductive fluid, for example saline water, having a predetermined index of refraction. The second fluid 121 comprises an oil-based electrically insulating fluid, for example silicone oil. Hence, in this embodiment of the present invention, the first fluid 120 and the second fluid 121 are both liquids. The first fluid 120 and the second fluid 121 lie in contact with each other at two fluid menisci 125, 126.

An example of a fluid system is based on the electrowetting oil polydimethyl(8-12%)-phenylmethylsiloxame copolymer and saline water. An example of the corresponding index of refraction for oil is n=1.425 and for water is n=1.349. However, a stronger switching effect can be obtained when switching between liquid and air/vapor (e.g. saline water and air).

In a first discrete state of the switchable lens, as illustrated in FIG. 1, the first fluid 120 substantially fills the lens chamber 101 and a portion of the storage chamber 104. By substantially filling, it is meant that the first fluid 120 lies in contact with at least most of the lens face 105. Furthermore, in this state, the first fluid 120 lies in contact with at least most of the exposed surface of the hydrophobic fluid contact layer 107 in the chamber.

Additionally, there is a common, third electrode 130 formed for example from a metal, located in the storage chamber near the opening 102 of the lens chamber. The common electrode 130 lies in contact with a portion of the storage chamber 104 that is always filled by the first fluid 120.

In the first discrete state of the lens, the second fluid 121 substantially fills the storage chamber 104 except for the portion filled by the first fluid 120 which is in contact with the common, third electrode 130. In the second discrete state of the switchable lens, as illustrated by FIG. 2, the first fluid 120 substantially fills the storage chamber 104. In this second discrete state the first fluid 120 continues to lie in contact with the common third electrowetting electrode 130 located in the previously described portion of the storage chamber 104. The first fluid 120 now lies in contact with the hydrophobic fluid contact layer 111 of the storage chamber 104, and the second fluid 120 substantially fills the lens chamber 101. Hence, the second fluid 120 now lays in contact with the lens face 105 and the exposed surface of the hydrophobic fluid contact layer 107 of the lens chamber 101. Additionally, a portion of the storage chamber 104 is filled by the second fluid 121. This portion of the storage chamber 104 is at the opposite end of the portion in which the common, third electrode 130 is located.

The first, second, and third electrodes 108, 112, and 130 form a configuration of electrowetting electrodes which together with a voltage control system (not shown) form a fluid system switch. This fluid system switch acts upon the described fluid system comprising the first and the second fluids 120, 121 in order to switch between the described states of the switchable optical element.

In the first discrete state of lens, an applied voltage $V_1$ of an appropriate value is applied across the first electrowetting electrode 108 and the common, third electrode 130. The applied voltage $V_1$ provides an electrowetting force such that the switchable lens of the present invention tends to adopt the first discrete state wherein the electrically conductive first fluid 120 moves to substantially fill the lens chamber 101. As a result of the applied voltage $V_1$, the hydrophobic fluid contact layer 107 of the lens chamber 101 temporarily becomes at least relatively hydrophilic in nature, thus aiding the preference of the first fluid 120 to substantially fill the lens chamber 101. It is envisaged that whilst in the first discrete state, no voltage is applied across the second electrowetting electrode 112 and the common, third electrode 130, such that the fluid contact layer in the storage chamber remains relatively highly hydrophobic.

Depending on the application at hand, the applied voltage may be about 10 V. The polarity of the voltage is typically irrelevant, and it is alternatively possible to use an alternating voltage having a corresponding effective value. An alternating voltage may even be preferable for some application, since it may reduce the build-up of remnant DC in the cell that could otherwise affect the addressing of the cell. However, the voltage $V_1$ is dependent on several variables such as thickness of the insulating layer, surface tensions, and dielectric constant of the insulating layer. Furthermore, the ratio of surface area between the lens chamber and the storage chamber is important: if this ratio is one, the liquids do not have a preference for the channel or the cavity. If the surface area of the lens chamber is larger than the surface area of the storage chamber, the saline water will prefer to stay in the cavity when no voltage is applied. In this case switching the saline water into the lens chamber may occur without applying a voltage, whereas removing the saline water into the storage chamber will need a relatively high voltage. Thus the ratio of surface areas is a factor in determining the switching voltages.

In order to switch between the first discrete state and the second discrete state of the switchable lens, the voltage control system of the fluid system switch switches off the applied voltage $V_1$ and applies a second voltage $V_2$ of an appropriate value across the second electrowetting electrode 112 and the common, third electrode 130. The value of $V_2$ is selected on the same basis as $V_1$ described above. Additionally, it is envisaged that the voltage $V_1$ applied across the first electrowetting electrode 108 and the common, third electrode 130 is switched off so that no voltage is applied across the first electrowetting electrode 108 and the common, third electrode 130.

The switchable lens now lies in the second discrete state, in which the first fluid 120 substantially fills the storage chamber 104 as a result of electrowetting forces provided by the applied voltage $V_2$. With the applied voltage $V_2$ the hydrophobic fluid contact layer 111 of the storage chamber 104 is now at least relatively hydrophilic and tends to attract the first fluid 120. Obviously, the portion of the storage chamber 104 in which the common third electrode 130 is located is still filled by the first fluid 120. As described earlier, the second fluid 121 now substantially fills the lens chamber 101. The hydrophobic fluid contact layer 107 of the lens chamber 101 is now relatively highly hydrophobic and aids this arranging of the second fluid in the second discrete state.

During the transition between the first and the second discrete states of the lens, as controlled by the fluid system switch, the first and second fluids 120, 121 of the fluid system flow in a circulatory manner through the fluid system, each of the fluids displacing each other. In this circulatory fluid flow during the transition from the first to the second discrete state, the first fluid passes out of the lens chamber 101 into one end of the storage chamber 104 via one opening 102 of the lens chamber 101 and the second fluid 121 passes into the lens chamber 101 via the other opening 103 of the lens chamber 101. During transitions from the second to the first discrete state, an opposite circulatory fluid flow occurs.

Consequently, when changing from the first discrete state to the second discrete state, the applied voltage $V_2$ across the second electrowetting electrode 112 and the common, third electrode 130 attracts the electrically conductive first fluid 120 into the lens chamber 101, thus displacing the electrically insulating second fluid 121 out of the lens chamber 101. Furthermore, the hydrophobic fluid contact layer 107 of the lens chamber 101 repels the electrically conductive first fluid 120 out of the lens chamber 101 into the storage chamber 104. Transition from the second to the first discrete state is, obviously, the reverse of the transition from the first to the second discrete state in these terms.

The lens 100 that is described above with reference to FIGS. 1 and 2 has a spherical lens face 105. Such a lens, having a traditional spherical shape, is usable for many applications where a discretely switchable lens power is desired. But, the spherical lens shape does not facilitate compensation of aberrations occurring when, for example, using the lens as a macro lens switch.

However, the lens face may have an almost arbitrary shape, and may in particular have an aspherical shape. The actual lens shape is typically restricted by manufacturing considerations. In case the lens face is formed out of a polymer surface, a large freedom of choice is provided by, for example, utilizing an in situ polymerization technique (such as ultraviolet polymerization using a releasable mould).

Figure 3:
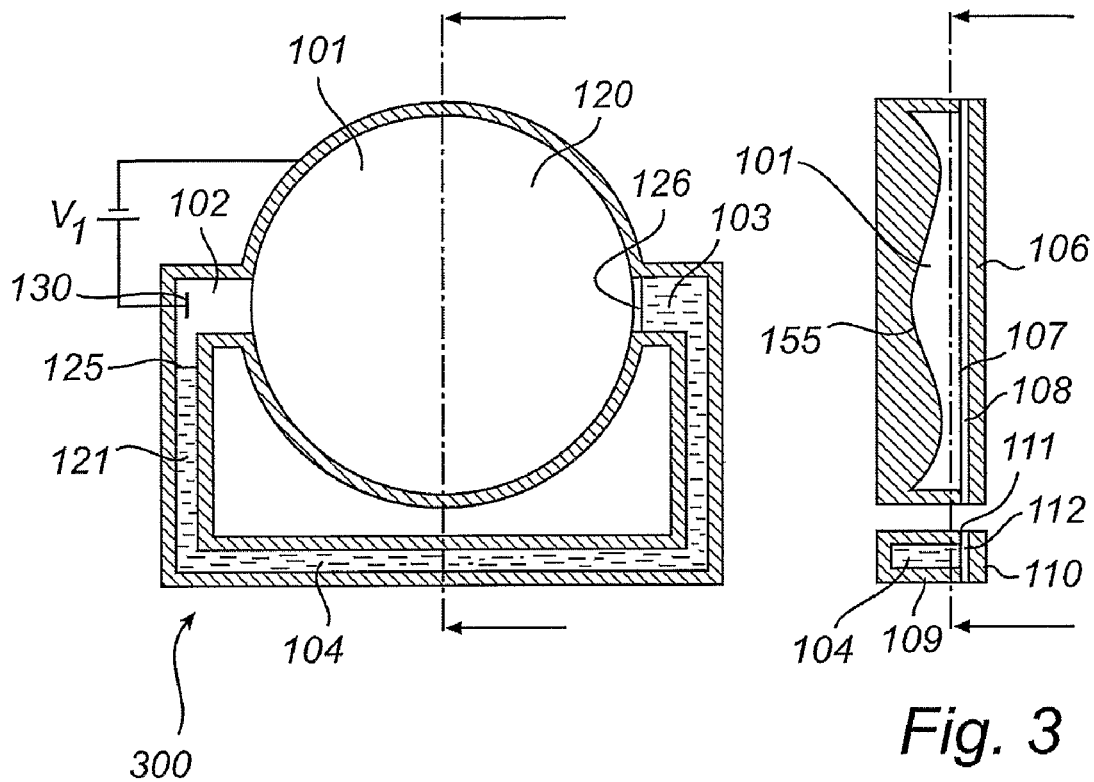
FIGS. 3 and 4 illustrate top views and cross-sections of a discretely adjustable lens having an aspherical lens face and being in a first and a second discrete state, respectively.
Figure 4:
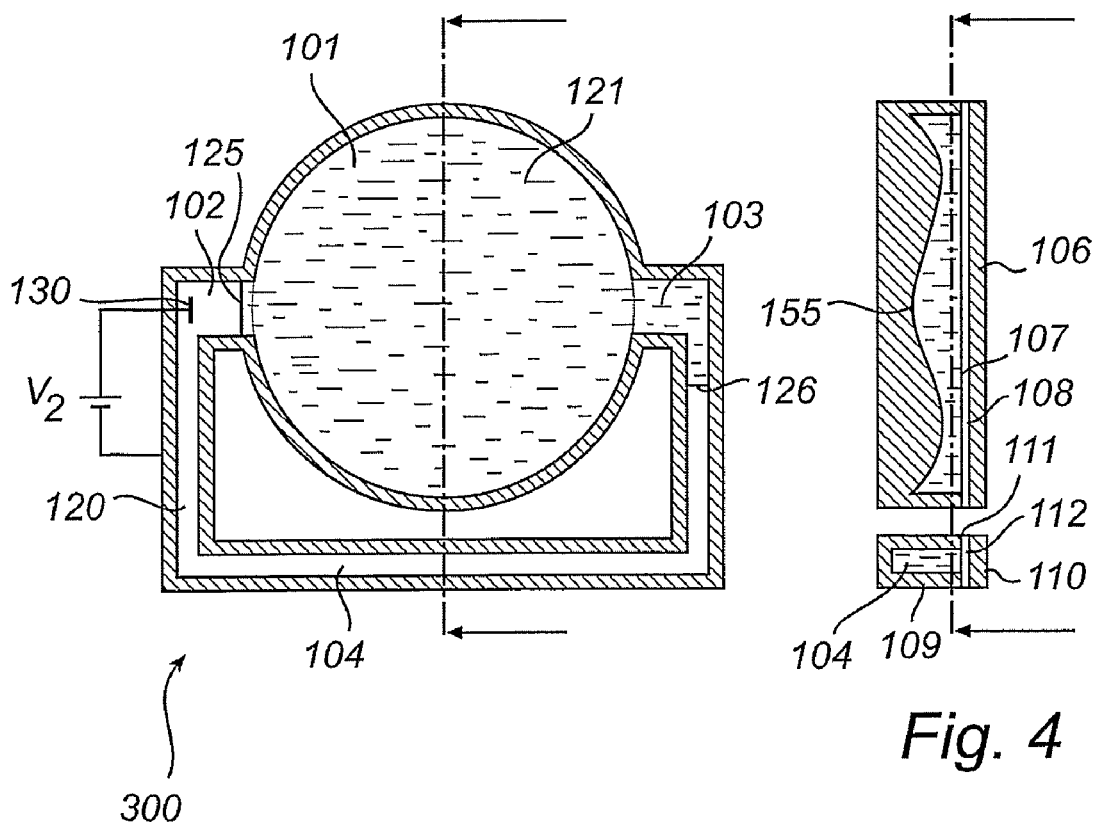

FIGS. 3 and 4 illustrate a lens 300 having an aspherical lens face 155. Besides the difference in lens face shape, lens 300 has the same features, indicated with the same reference numbers, as the lens 100 that is illustrated in FIGS. 1 and 2.

Figure 5:
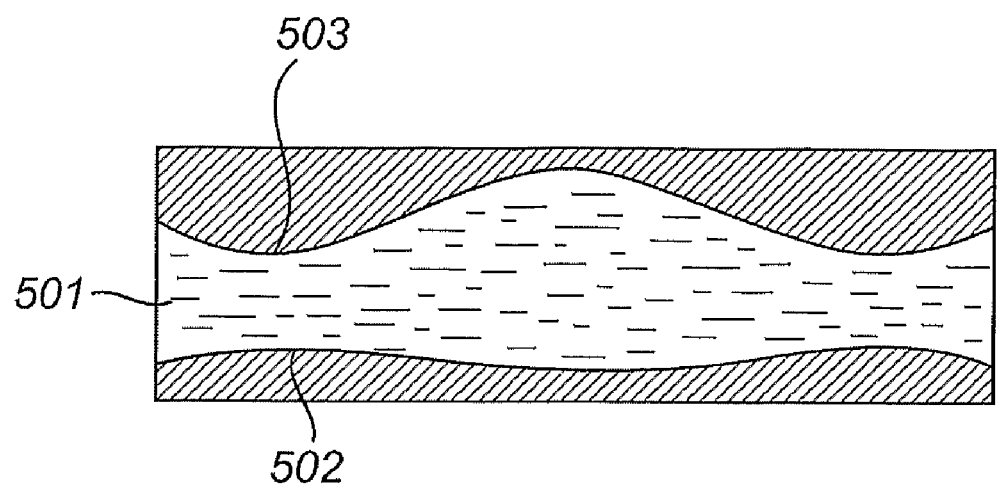
FIG. 5 illustrates a cross-section of a lens chamber having two lens faces.

The freedom in design for the lens may be further enhanced using both faces in the lens chamber, i.e. by adding a suitably shaped form on the cover plate 106. Thereby the lens shaped interfaces will be provided in the lens. A cross-section of a lens chamber having two lens shaped faces is illustrated in FIG. 5. Thus, FIG. 5 illustrates a cross-section of a lens chamber 501 having two aspherical lens faces 502 and 503. As is readily understood, the actual shapes of the lens faces depend on the application at hand and may be calculated using conventional ray tracing software.

As stated above, a lens in accordance with the present invention is excellent for use as a macro switch in a camera arrangement. Consider a conventional focusing lens based on continuously adjustable electrowetting lenses. Such a lens is typically capable of focusing objects ranging from infinity to 100 mm. In order to convert this standard lens into a lens with macro switch, a discretely adjustable lens as described above is added in front of the standard lens. The chamber may, for example, be formed out of PMMA (Poly(methyl methacrylate)), and one of the lens surfaces may be aspherical in order to compensate for aberrations otherwise occurring. In a macro switch application, one of the fluids in the fluid system preferably has the same index of refraction as the lens face. Thereby the lens is switchable between a passive state, where the macro lens has no optical power, and an active state, where the macro lens is operative. In case the lens camber is formed out of PMMA, oil having an index of refraction that is equal to that of PMMA may be used together with saline water in the fluid system. In such case, when the chamber is filled with oil, the additional lens has no effect and the lens system acts as a conventional focusing lens. However, when the chamber is filled with water, the lens system becomes a macro lens. With the binary switch in the macro position the above focusing range is converted into a range of 50 mm to 34.5 mm. Hence, the closest distance that can be focused is now three times smaller than for the conventional lens.

Figure 6:
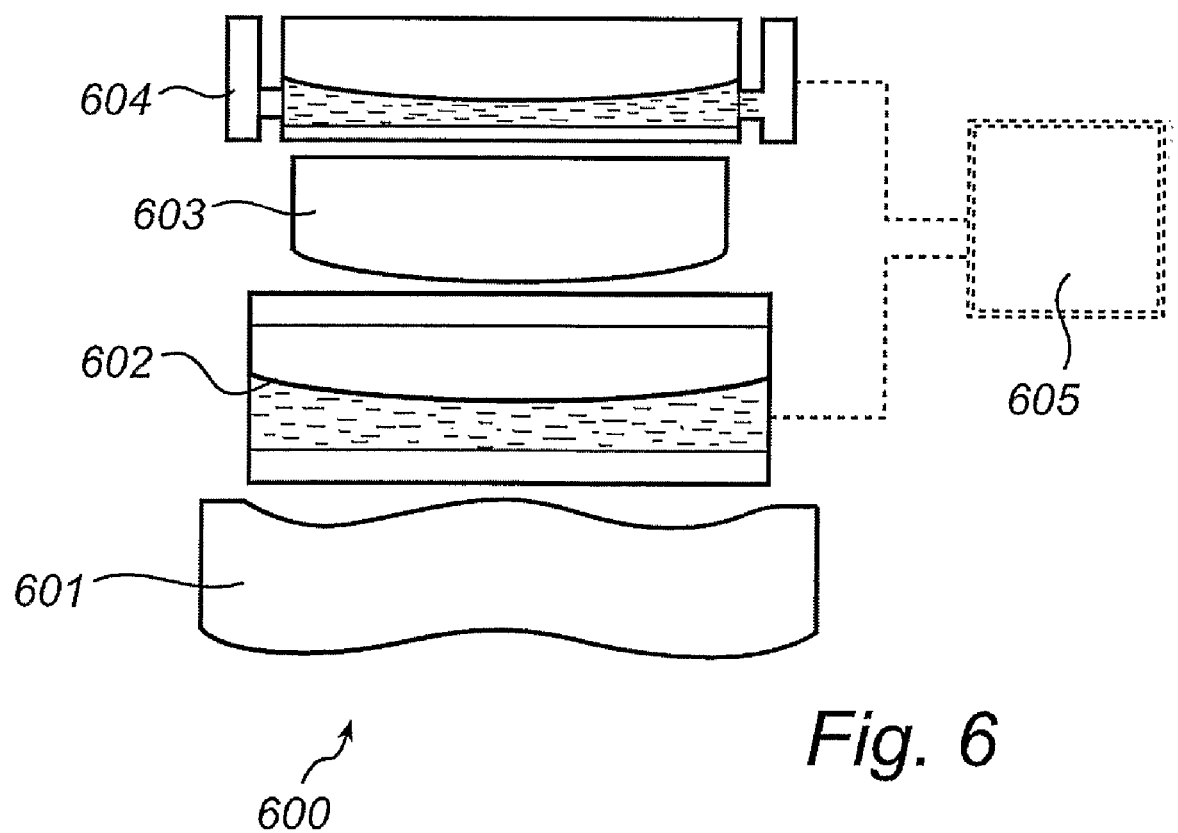
FIG. 6 illustrates across section of a camera lens arrangement carrying a discretely adjustable lens and an additional, continuously adjustable focusing lens.

An example of a lens arrangement 600 comprising a continuously adjustable electrowetting lens 602 is illustrated in FIG. 6. The arrangement 600 thus comprises a first lens 601 (e.g. a wave front modifier), a continuously adjustable electrowetting lens 602, a second lens 603 and a discretely variable electrowetting lens 604 in accordance with the present invention. However, the discretely adjustable macro lens 604 does not have to be a separate element in the camera lens arrangement. It is alternatively possible to give an outer surface of the macro element a lens shape. Thereby it is possible to omit one of the lenses originally present in the electrowetting lens arrangement (e.g. the second lens 603). Or, in other words, one of the original lenses may be provided with a cavity that can be filled with liquids. In this way the system can remain compact.

FIG. 6 furthermore illustrates a control unit 605 for controlling the continuously adjustable electrowetting lens 602 as well as the discretely adjustable electrowetting lens 604.

Thus, the present invention provides a discretely adjustable lens 100, 300, 604 is controllable by means of electrostatic or electrowetting forces. The lens provides two accurately reproducible and freely designable lens states that are defined by interfaces between one out of two fluids 120, 121 and at least one lens face 105, 155. Changing place of the fluids by means of electrostatic or electrowetting forces provides for switching between the lens states. The lens may, for example, provide a macro lens option in a camera lens arrangement.

The invention claimed is:
1. A discretely adjustable focusing lens comprising:
a lens chamber defining a light path and having at least one lens face (105, 155) arranged along that light path;
a storage chamber that is fluidly connected with the lens chamber, such that the lens chamber and the storage chamber together form a closed system;
a fluid system residing in said chambers and including a first fluid, having a first index of refraction, and a second fluid, having a second index of refraction that is different from the first index of refraction, said fluids furthermore being immiscible and exhibiting different forces of attraction to electric fields; and
a fluid system switch comprising electrodes, operative to rearrange the fluid system between a first discrete state and second discrete state by means of electrostatic forces, wherein, in the first discrete state, the at least one lens face is substantially covered by the first fluid, and, in the second discrete state, the at least one lens face is substantially covered by the second fluid
means for using electrostatic forces to move at least a portion of one of said first fluid and said second fluid from said lens chamber to said storage chamber.

2. A lens according to claim 1, wherein the closed system comprises interior surfaces that have different wettability in respect of the first and the second fluids.

3. A lens according to claim 1, wherein at least one lens face has an aspherical shape that provides for a combination of focusing power and aberration compensation.

4. A lens according to claim 1, wherein the lens chamber has two lens faces arranged along the light path.

5. A lens according to claim 1, wherein at least one lens face is formed of a material that has the same index of refraction as one of the fluids.

6. A camera lens arrangement comprising a discretely adjustable focusing lens as defined in claim 1, wherein the discrete states of the discretely adjustable focusing lens correspond to a macro lens state and a micro lens state.

7. A camera lens arrangement according to claim 6, further comprising at least one additional lens that is continuously switchable by means of electrowetting forces.

8. A camera lens arrangement according to claim 6, wherein the discretely adjustable focusing lens forms an integral part with at least one additional lens in the camera lens arrangement.

9. A camera module comprising a camera lens arrangement according to claim 6, and a digital image sensor.

10. A mobile phone having a camera functionality and comprising a camera lens arrangement according to claim 6.

* * * * *